(12) United States Patent
Smith

(10) Patent No.: US 8,537,811 B1
(45) Date of Patent: *Sep. 17, 2013

(54) SPEAKER-BUFFER MANAGEMENT FOR VOICE-OVER-INTERNET-PROTOCOL (VOIP) TRIGGERED BY MICROPHONE-BUFFER ARRIVAL

(75) Inventor: Shawn W. Smith, Ventura, CA (US)

(73) Assignee: Google Inc., Mountain View, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/330,447

(22) Filed: Dec. 19, 2011

Related U.S. Application Data

(63) Continuation of application No. 10/604,452, filed on Jul. 22, 2003, now Pat. No. 8,081,621.

(51) Int. Cl.
*H04L 12/66* (2006.01)

(52) U.S. Cl.
USPC .......................................... 370/352; 370/356

(58) Field of Classification Search
USPC ................................................. 370/352, 356
See application file for complete search history.

*Primary Examiner* — Rasha Al Aubaidi
(74) *Attorney, Agent, or Firm* — Birch, Stewart, Kolasch & Birch, LLP

(57) ABSTRACT

A Voice-over-Internet-Protocol (VoIP) system has improved audio-buffer control. Voice captured by a microphone (mic) is loaded into mic buffers by the sound card and sent to a VoIP application. When a mic buffer arrives from the sound card, a speaker buffer manager is activated. Voice data extracted from incoming VoIP packets is loaded into a speaker buffer and sent to a speaker queue on the sound card for playback. A speaker-buffer count is kept and increased as each speaker buffer is sent to the sound card, and decreased as each empty speaker buffer is recycled from the sound card back to the VoIP application. As each mic buffer arrives, the speaker buffer manager compares the speaker-buffer count to upper and lower limits and sends zero, one, or two speaker buffers when the speaker-buffer count is above, between, or below the limits. Speaker-buffer latency and playback timing irregularities are reduced.

12 Claims, 8 Drawing Sheets

SPEAKER-BUFFER MANAGEMENT FOR VOICE-OVER-INTERNET-PROTOCOL (VOIP) TRIGGERED BY MICROPHONE-BUFFER ARRIVAL

BACKGROUND OF INVENTION

This invention relates to voice-over-Internet-Protocol (VoIP) systems, and more particularly to control of audio data flow to and from a sound card.

Telephone calls can now use the Internet rather than traditional telephone lines. Voice-over-Internet-Protocol (VoIP) applications capture a user's voice, digitize and compress the voice, and transmit the coded voice as data inside Internet-protocol (IP) packets that can be sent over the Internet.

VoIP applications can be installed on personal computers (PC's), other devices connected to the Internet, or on translation servers such as Internet-to-Telephone gateways or Protocol Converters. Each party to a call runs a local copy or client of the VoIP application. When a PC is used, the VoIP application typically uses the existing sound card installed on the PC to play the remote caller's voice on a speaker, and to capture the local users voice from a microphone plugged into the sound card.

FIG. 1 is a diagram of a prior-art VoIP system. VOIP application A on PC 10 is operated by user A while VOIP application B on PC 12 is operated by user B at different nodes on the Internet. User A's speech is captured by a microphone plugged into a sound card in PC 10. The captured voice is digitized, coded, compressed, and fitted into IP packets by VOIP application A on PC 10. These IP packets containing user A's voice are routed over Internet 16 to VOIP application B on PC 12.

VOIP application B on PC 12 receives these IP packets, extracts and de-compresses the voice data, and sends the voice data to a sound card on PC 10 which generates audio signals to drive a speaker that plays the voice as audio to user B. User B's voice is then captured by a microphone attached to the sound card, converted to digital signals and coded, compressed, and fitted into IP packets by VOIP application B on PC 12. The IP packets containing user B's voice are also routed over Internet 16 back to VOIP application A on PC 10 for playback to user A, achieving a full-duplex voice call.

A wide variety of sound cards from many different manufacturers may be installed on any given PC. These sound cards often are controlled and driven from the PC by standard software interfaces such as Windows multi-media input-output (MMIO) wave drivers by Microsoft Corp. Originally sound cards were designed for basic (half-duplex) tasks such as playing sound effects in early PC games. Simultaneously capturing voice while playing the speaker was not a design priority. More recently, VoIP applications need full-duplex audio, yet the sound cards and their interfaces are not optimized for such full-duplex tasks.

FIG. 2 shows a prior-art VoIP application using large audio buffers to a sound card during a full-duplex voice call. VoIP application 30' is running on the local PC that has sound card 20 installed. Incoming voice data is received from the Internet from a remote caller. The remote caller's voice data is extracted from these IP packets and decoded as voice data "V". This remote voice data is loaded into buffers such as buffer 26' on the PC and then sent to sound card 20 as buffer 26". Buffer 26" goes to the top of the first-in-first-out (FIFO) stack of buffers that includes other buffers 38 that should be played before buffer 26", and next buffer 32 which is to be played once the current buffer has finished playing its voice data on speaker 22.

Once all the voice data in a buffer has been played to speaker 22, then the empty buffer 26 can be recycled to the PC and re-loaded with more recent voice data from the remote user. Buffers could be destroyed (deleted) and new buffers generated on the PC, but typically operation of the Windows MMIO re-uses the buffers after playback. The voice data is typically still in the buffer, but it is overwritten with new voice data from VoIP application 30'. Alternately, pointers to the buffers may be transferred between VoIP application 30', and the Windows MMIO sub-system.

Microphone 24 captures the local users voice and writes the digitized microphone (mic) data "M" into a current mic buffer 34 on sound card 20. Sound card 20 has an inventory of empty buffers 36 ready to be filled with microphone data. Once buffer 28 is filled with mic data, buffer 28 is passed back to the Windows MMIO on the PC and VoIP application 30' reads the mic data from buffer 28', and processes the mic data and sends it over the Internet to the remote caller using IP packets.

Once the mic data has been read from buffer 28' (or a copy of buffer 28' made), then the empty buffer 28" can be sent back to sound card 20 and added to the inventory of empty mic buffers. Thus full and empty microphone buffers and voice (speaker) buffers are passed and recycled between the PC and sound card 20.

Most sounds on PC's are produced by loading a digital representation of the sound onto the sound card in large (or entire) chunks, and then the sound card produces the requested sound. Buffers 26, 32, 38 each typically contain 60-200 milli-seconds (ms) or more of audio data. Similarly, sounds captured by the microphone are often buffered into large chunks (60-200 ms buffers 28, 34, 36) that can be stored on disk whenever convenient. While such large buffers may be efficient for the PC, the large audio length may cause timing issues such as latency, alignment of incoming and outgoing audio, and clock accuracy, as audio is aligned at the boundaries of lengthy buffers. The MMIO interface is limited in its ability to determine the exact timing that the sound card is using in playing buffers of audio. Applications hand buffers to the MMIO layer, and at some future time the MMIO layer hands buffers back to be recycled. There is no query in MMIO to determine which buffer is currently being played back, or to determine the number of buffers on the sound card. There is no mechanism to signal when the speaker queue on the sound card is about to go empty that can reliably operate in very small time increments (below 60 to 100 mSec). Other, more sophisticated interfaces do exist, but are not supported as widely. For example DirectX 8.0 has more alignment and buffer signal choices, but can only be used on Windows XP.

There may be a significant delay from the time when a buffer 26" of the remote caller's voice data is loaded into the top of the playback queue and when the buffer 26" is finally played by the speaker, since other buffers 38, 32 must be played first, and these can be long buffers. For example, when 5 buffers of 200 ms of voice data are waiting to be played, the total queue delay is 1 second. A one-second delay in playback can be noticeable and quite annoying in a phone call. The general goal for VOIP is a total delay of no more than 125 to 250 mSec for the entire trip from one user to the other including all the delays across the Internet.

Since the microphone data buffers tend to be sent back to the PC immediately once filled, delays in mic data are less of a problem. The mic queue has empty buffers while the speaker queue has buffers full of voice data, so the speaker queue is especially a problem as it can add audio delays to playback. These delays can be significant when large buffers are used since the worst-case latency includes the delay to fill the mic buffer.

Issues of timing, clock accuracy, full-duplex (using both microphone and speaker feeds at the same time), latency, and alignment are not important for many computer sound tasks, and thus the interfaces and designs of sound cards and their drivers on many personal computers do not lend themselves to efficient low latency full-duplex streaming. Software drivers, operating systems, and other components can further alter timing. The use of large audio buffers compound these timing problems.

Sound cards vary widely in actual performance. Erratic behavior is sometimes observed in playback rates and transfer timing of the speaker buffers. Empty speaker buffers may be recycled after varying delays rather than precisely in sync with the audio playback timing. If the inventory of speaker buffers becomes empty, playback will pause, noticeably degrading the audio quality heard by the user. Thus the sound card is normally passed all speaker buffers as soon as possible, keeping the inventory of speaker buffers on the sound card as full as possible. This large inventory of speaker buffers increases latency as a large queue is used. Empty speaker buffers are then re-filled and returned to the sound card as soon as possible by the VoIP application.

What is desired is a VoIP system that more efficiently buffers audio to and from the sound card. Improved reliability and performance of streaming full duplex audio to and from the multi media sound subsystem of a computer such as a Windows PC is desirable. Reduction of the number of buffers in the speaker queue and the use of smaller audio buffers to the speaker queue is also desirable. A more tightly-coupled and adaptive full-duplex audio-buffer management scheme is desired.

DETAILED DESCRIPTION

The present invention relates to an improvement in VoIP audio buffering. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
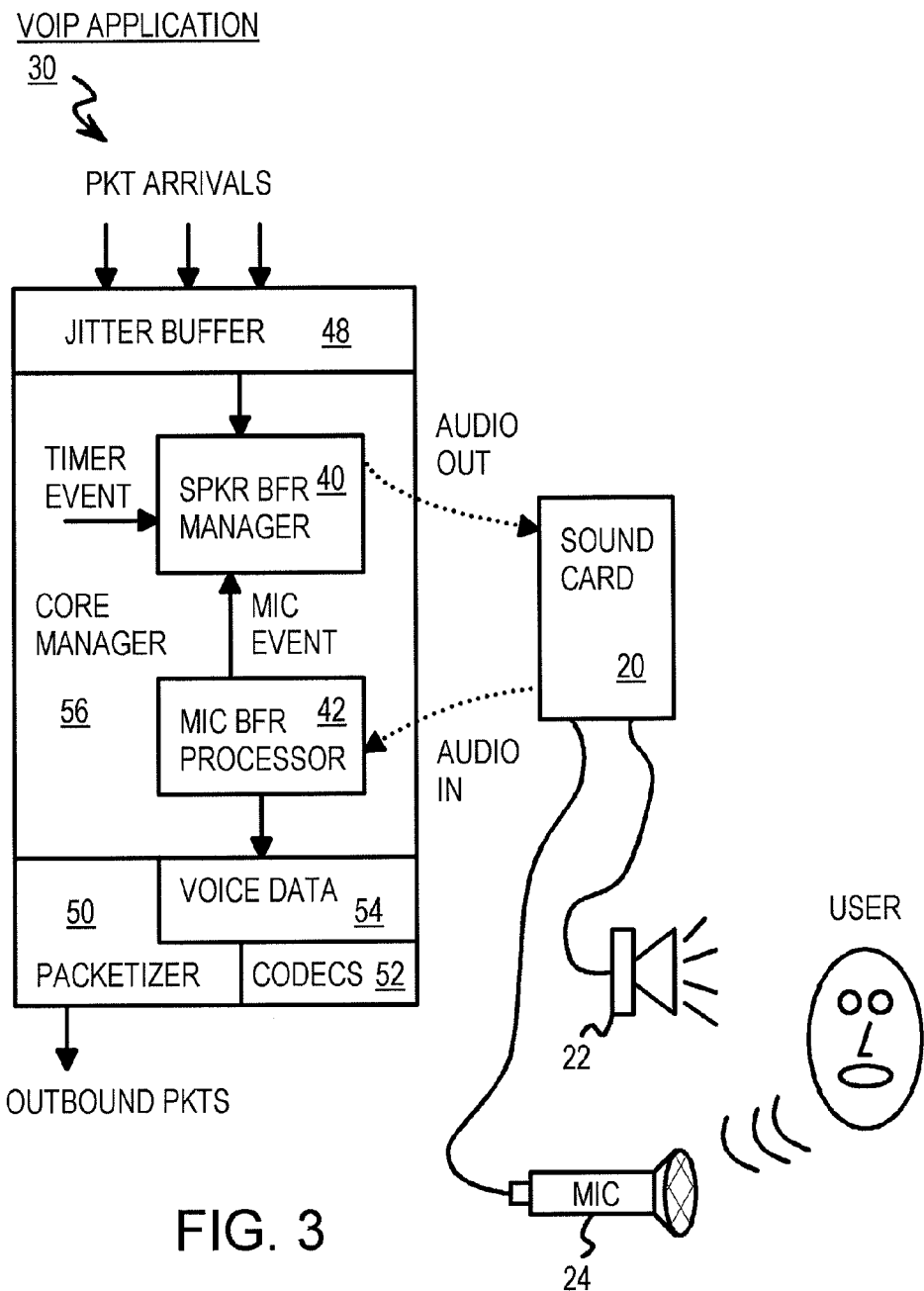
FIG. 3 shows in more detail a VOIP application with improved audio buffering management.

FIG. 3 shows in more detail a VOIP application with improved audio buffering management. The local user's voice is captured by microphone 24, converted to digital data by sound card 20, and packed into buffers that are sent from audio card 20 to VoIP application 30 running on the local PC. The microphone data is extracted from the buffers by microphone buffer processor 42 and the empty mic buffer recycled to sound card 20 so it can later be filled with more mic data.

The mic data contains user A's voice and is stored as digitized voice data 54 once extracted or copied from the mic buffers by microphone buffer processor 42. Codecs 52 are one or more voice encoders that compress and encode the raw digitized voice using a variety of algorithms. Some algorithms may be more bandwidth-efficient than others but have lower voice quality. Standard as well as proprietary codecs can be used. Packetizer 50 forms the outgoing IP packets by adding headers and catalogs of the voice data to the encoded voice data from codecs 52.

Incoming packets with user B's voice data are received and stored by jitter buffer 48. Variable Internet transit delays and variations in packet reception times are accommodated by jitter buffer 48, and packets can be re-ordered by sequence number if received out of order. The packets are sent to core manager 56 of VOIP application 30, which extracts the voice data from the packets, examines the voice catalog, and selects the specified codec to decode and decompress the voice data. The final decoded, decompressed voice data is loaded into an empty speaker buffer by speaker buffer manager 40 and sent to sound card 20. The audio in the speaker buffer received by sound card 20 is played by speaker 22 as audio output to local user A.

The inventor has discovered that a tight coupling between the audio input and audio output buffering can improve buffer management. Rather than have speaker audio buffer management be completely isolated from microphone buffer management, the inventor has discovered that the microphone buffer management can be used to control speaker buffer management. When a new microphone buffer is received from sound card 20, microphone buffer processor 42 generates a "microphone event" signal to speaker buffer manager 40. This microphone event activates speaker buffer manager 40, which then can send one or more speaker buffers to sound card 20.

Thus microphone buffer timing is used to control timing of speaker buffers sent to the sound card. An arrival of a new microphone buffer activates speaker buffer manager 40. More careful control of the number of speaker buffers on sound card 20 can also improve buffering. Latencies can be reduced by reducing the number of speaker buffers stored on sound card 20. Using smaller size buffers can further reduce latencies. Smaller-size speaker buffers require more accurate timing, which can be more easily measured from the arrival of microphone buffers than from the timing of the recycled speaker buffers themselves. Some sound cards may accumulate "empty" speaker buffers before recycling them back to the PC, adding to timing inaccuracies.

Since the microphone data has not yet traversed the Internet, it does not have the variable delays that the speaker data contains after having passed through the Internet. Thus the microphone data is much more accurately timed than the speaker data. The microphone data arrives from the sound card at regular intervals as each mic buffer fills up. These mic intervals are not varied by Internet delays since the mic data can only be delayed by the local PC being busy with some other task. Since the sound card can often interrupt tasks on the local PC within a short time, the mic buffers are loaded onto the local PC with little delay. In contrast, speaker data passes from the remote user's PC through many routers and paths on the Internet, and can have widely varying delays. Thus the speaker data can have much larger delays and variations in delay than the does the mic buffers.

Figure 4:
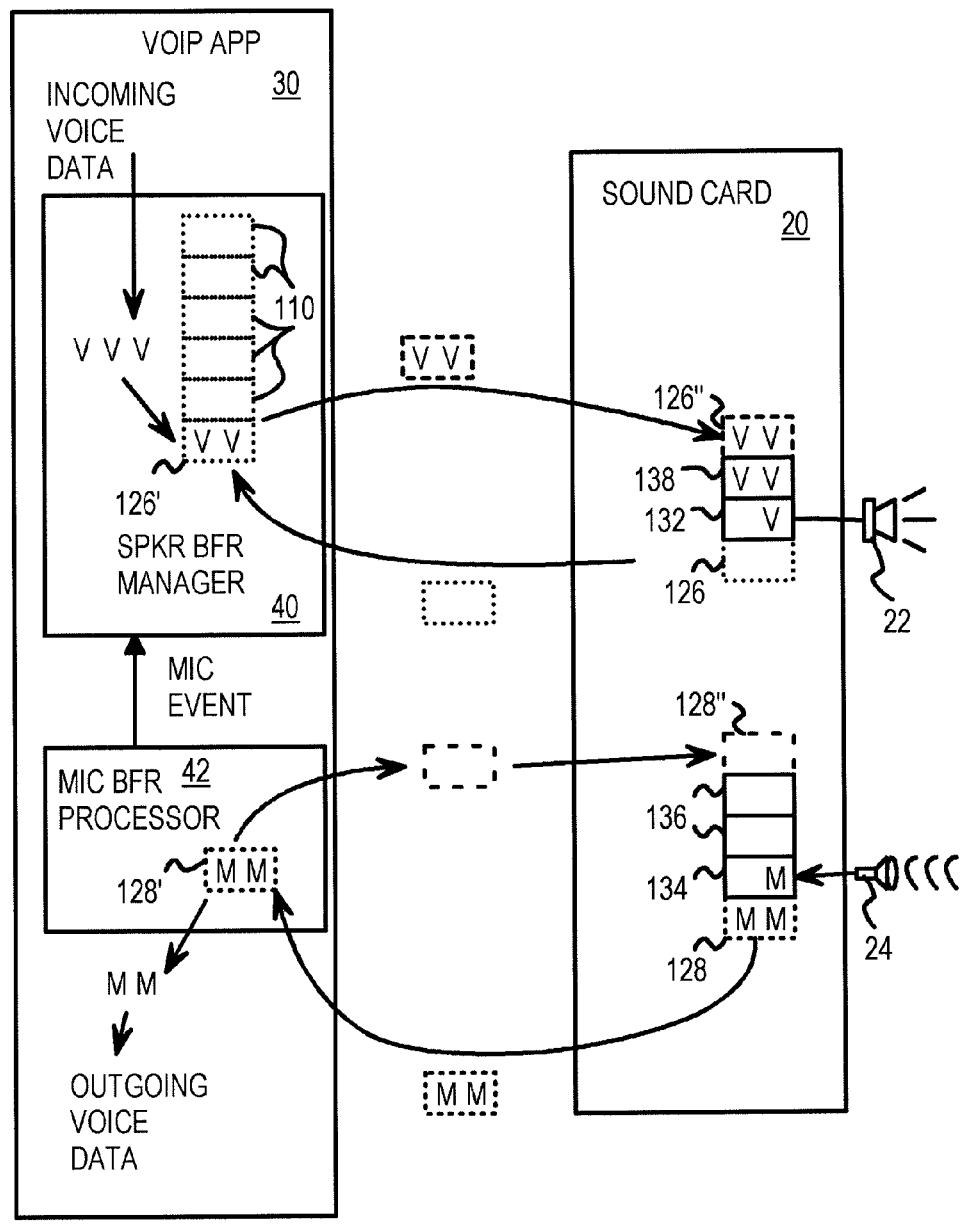
FIG. 4 shows speaker buffers being managed when microphone buffers arrive from the sound card.

FIG. 4 shows speaker buffers being managed when microphone buffers arrive from the sound card. Sound card 20 digitizes voice captured by microphone 24 and loads this digitized voice data as microphone data "M" into current mic buffer 134. Once mic buffer 134 is full, it becomes full mic buffer 128 and is sent from sound card 20 to VoIP application 30 running on the local PC.

The newly arrived mic buffer 128' is processed by microphone buffer processor 42, which extracts or makes a copy of the mic data, and passes this data to other components of VoIP application 30 for coding, compression, and packetization before being sent over the Internet to the remote VoIP application. The empty mic buffer 128" is recycled back to sound card 20, which contains a queue of empty mic buffers 136 waiting to be filled with microphone data.

Speaker Buffers Managed in Response to Microphone Buffer Arrival

When microphone buffer processor 42 receives a full mic buffer from sound card 20, microphone buffer processor 42 sends a mic event to speaker buffer manager 40. This mic event activates speaker buffer manager 40 to perform management of the speaker buffers. Speaker buffer manager 40 examines the number of full speaker buffers in the speaker queue on sound card 20 and decides how many, if any, speaker buffers to fill and send to sound card 20.

When the number of full speaker buffers 126", 138 in the speaker queue on sound card 20 waiting to be played on speaker 22 is within a desired range, speaker buffer manager 40 can fill and send one speaker buffer 126' with speaker data extracted form the incoming IP packets. Speaker buffer 126' is filled and sent to sound card 20 and placed at the top of the speaker queue as speaker buffer 126".

When too many full speaker buffers 126", 138 are in the speaker queue on sound card 20 waiting to be played on speaker 22, speaker buffer manager 40 can skip filling and sending any speaker buffers. This allows more time for speaker 22 to play the speaker data from the speaker buffers 126", 138 already in the speaker queue on sound card 20. Not sending a speaker buffer allows the number of full speaker buffers in the speaker queue to be reduced.

When too few speaker buffers are present in the speaker queue on sound card 20, two or more speaker buffers 126' may be filled and sent to sound card 20. This replenishes the speaker queue on sound card 20.

As speaker buffers are played by speaker 22 and emptied, the empty (played) speaker buffers 126 are recycled back to speaker buffer manager 40 on the PC. These empty speaker buffers may be filled and sent back to sound card 20 at the next microphone event, or may be kept in an inventory of empty speaker buffers 110 on the PC by speaker buffer manager 40.

Figure 1:
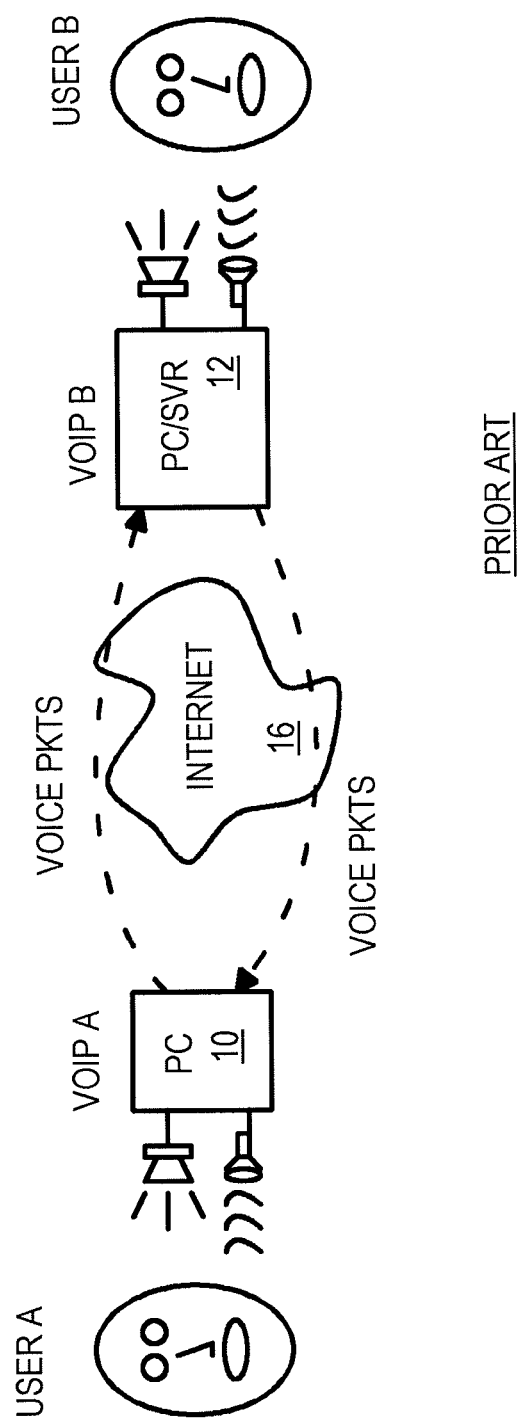
FIG. 1 is a diagram of a prior-art VoIP system.
Figure 2:
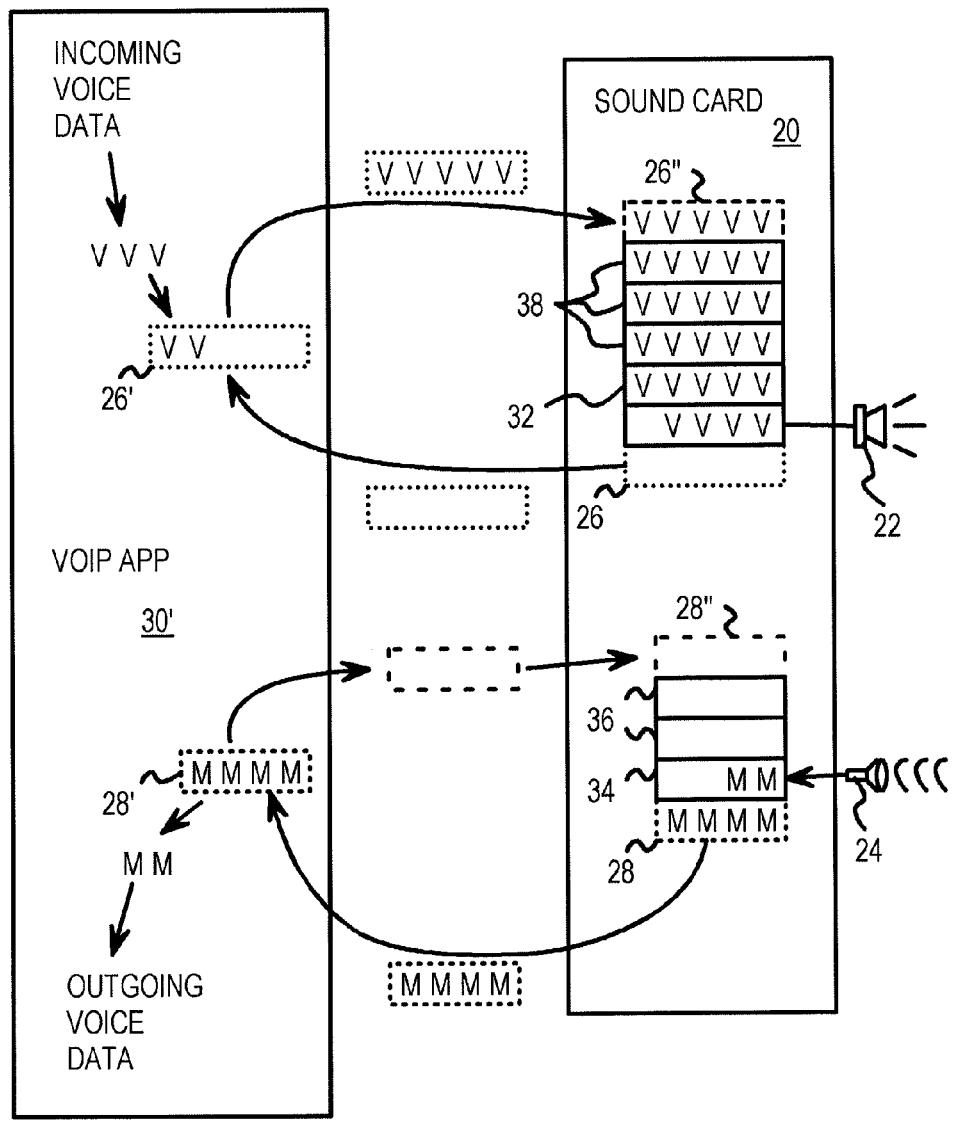
FIG. 2 shows a prior-art VoIP application using large audio buffers to a sound card during a full-duplex voice call.

The size of the mic and speaker buffers can be much smaller than for the prior art of FIG. 2. More active management of buffer queues allows for smaller buffer sizes and smaller amounts of audio data to be queued. For example, rather than use audio buffers containing contain 60-200 milliseconds (ms) of audio data, smaller audio buffers of only 20 ms of audio data can be used. These smaller buffers reduce latencies since a smaller amount of audio needs to be played to clear the speaker queue, or to finish the current audio buffer.

When some kind of timing error occurs, speaker buffer manager 40 may decide to skip ahead and delete some of the speaker data when the timing is off. This can be better accomplished by deleting some of the incoming voice data before it is loaded into a speaker buffer. Deleting filled speaker buffers is difficult, especially when the speaker buffers have already been sent to audio card 20. Thus recovery from timing problems is faster when the amount of speaker data already sent to sound card 20 is minimized. Latency is reduced.

Figure 5:
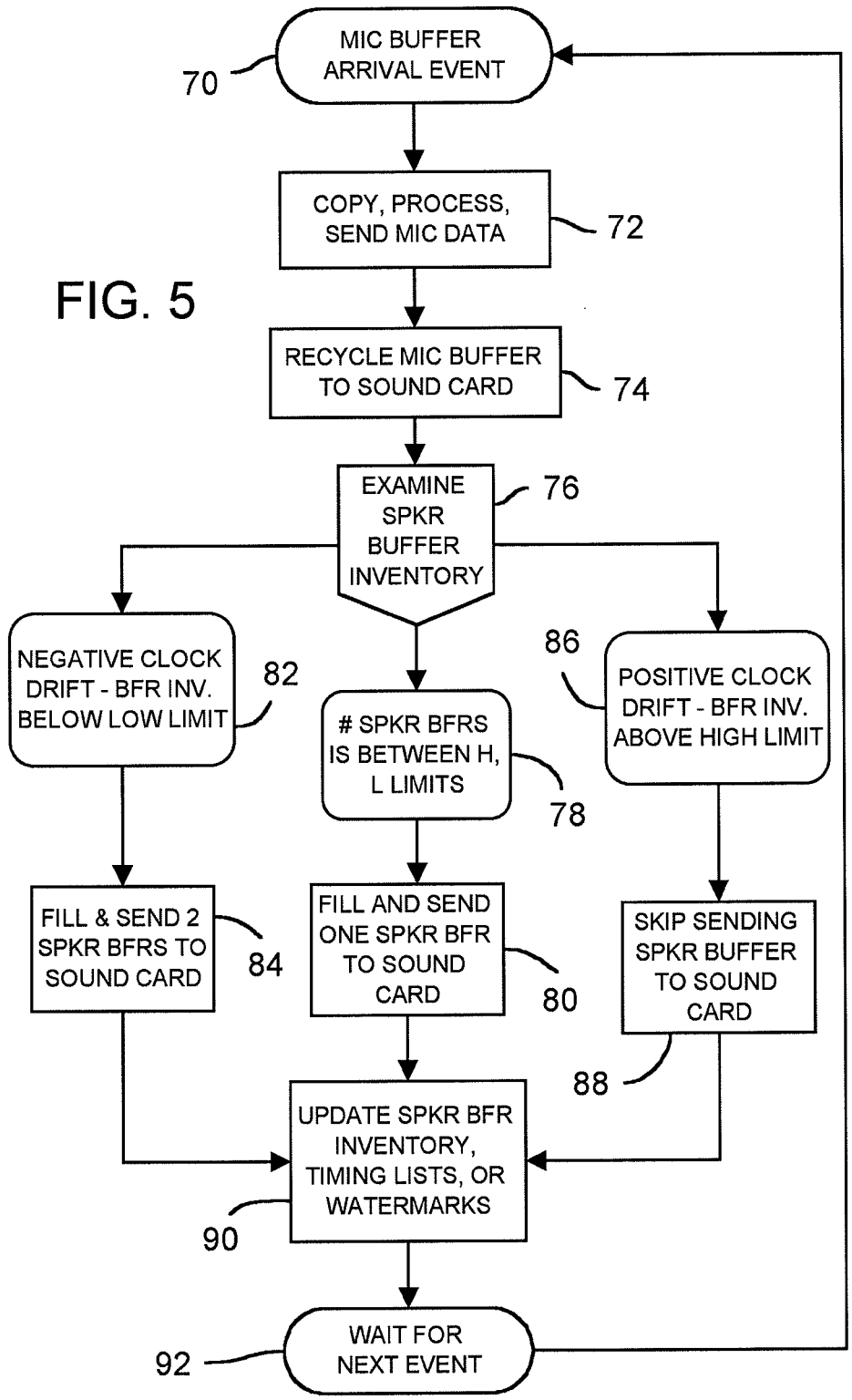
FIG. 5 is a flowchart of a speaker-buffer management process that is activated by arrival of a microphone buffer from the sound card.

Mic Buffer Arrival Triggers Speaker Buffer Transfer—FIG. 5

FIG. 5 is a flowchart of a speaker-buffer management process that is activated by arrival of a microphone buffer from the sound card. The inventor has observed that microphone-buffer timing is more precise than speaker-buffer timing, since the sound card captures voice at a pre-determined rate that is not subject to as many delays and interruptions as is the speaker data. Each time a microphone buffer arrives from the sound card, step 70, the process of FIG. 5 is activated. Microphone buffers should arrive at regular intervals as the mic buffers are filled, since the user's voice is sampled at a regular rate, such as 8,000 times per second. Unlike the speaker data, the mic data does not pass through the Internet and thus is not subject to varying Internet delays.

When the Windows MMIO driver receives a mic buffer from the sound card, it activates the flow of FIG. 5, starting with step 70. A copy of the voice data in the mic buffer is made, and the voice data is coded, compressed, and fitted into one or more IP packets, step 72. These IP packets are sent over the Internet to the remote caller's PC. The empty mic buffer can be sent or recycled back to the top of the sound card's microphone buffer queue once the voice data is copied, step 74.

The buffer management software or speaker buffer manager keeps track of the number of speaker buffers in the speaker queue on the sound card. Since the buffer manager running on the PC usually cannot directly examine the number of buffers on the sound card, the buffer manager keeps a running count of the number of buffers on the sound card. The running count can be increased each time a full speaker buffer is passed from the PC to the sound card, and decreased each time an empty speaker buffer is returned from the sound card to the PC. This running count or speaker-buffer count kept by the speaker buffer manager on the PC is examined, step 76, to determine how many speaker buffers need to be sent to the sound card.

The speaker-buffer count can be compared to an upper limit (high water mark) and to a lower limit (low water mark). When the speaker-buffer count is between the upper and lower limits, step 78, then clock rates are well-matched and one speaker buffer is filled with voice data from the remote caller and sent from the PC to the top of the speaker queue in the sound card, step 80. The speaker-buffer count is increased by one, step 90, and the speaker buffer manager waits for the next event, step 92.

When the speaker-buffer count is below the lower limit, step 82, then negative clock drift is detected. The microphone clock rate is a little faster than the speaker clock rate. Some sound cards use separate clocks for speaker and microphone audio sections, and these clocks may differ by a fraction of one percent, or even by several percent, even when both clocks are set to the same sampling/playback rate.

To compensate for the slower speaker clock rate, two speaker buffers are filled with voice data from the remote caller and sent from the PC to the top of the speaker queue in the sound card, step 84. This helps to replenish the speaker-buffer queue on the sound card. The speaker-buffer count is increased by two, step 90, and the speaker buffer manager waits for the next event, step 92.

When the speaker-buffer count is above the upper limit, step 86, then positive clock drift is detected. The speaker clock rate is a little faster than the microphone clock rate. To compensate for the faster speaker clock rate, no speaker buffers are filled and sent to the sound card, step 88. This allows more time to reduce the speaker-buffer queue on the sound card. The speaker-buffer count is no changed, step 90, and the speaker buffer manager waits for the next event, step 92.

When the speaker-buffer count remains above the upper limit for longer periods of time, voice data may need to be deleted entirely rather than just delayed. The VoIP application can decide what data to delete, such as by searching for quite period of time to delete rather than active speaking times.

When an empty speaker buffer arrives from the sound card, the speaker buffer manager decreases the speaker-buffer count by one. However, the empty speaker buffer is not immediately re-filled and sent back to the sound card. Instead, the empty speaker buffer is kept in the inventory of the speaker buffer manager at the PC. This process (not shown) is independent from the process of FIG. 5, which is activated by the arrival of a mic buffer from the sound card.

Ideally, the speaker buffer queue on the sound card can be kept as small as possible. The speaker queue may have only one full speaker buffer in addition to the current speaker buffer that is being played. Alternately, a more aggressive implementation may have only the current speaker buffer being played in the speaker queue, and no full speaker buffers. The lower limit may be set to just 1 or 2 buffers, but may be increased if problems occur, such as if the speaker buffer becomes depleted too often. The upper limit can be a larger value such as 12, or to values between 4 and 24. The limits can be fine-tuned to improve performance. These limits could be userchangeable, such as by settings in the VoIP program that can be adjusted by the user.

Figure 6:
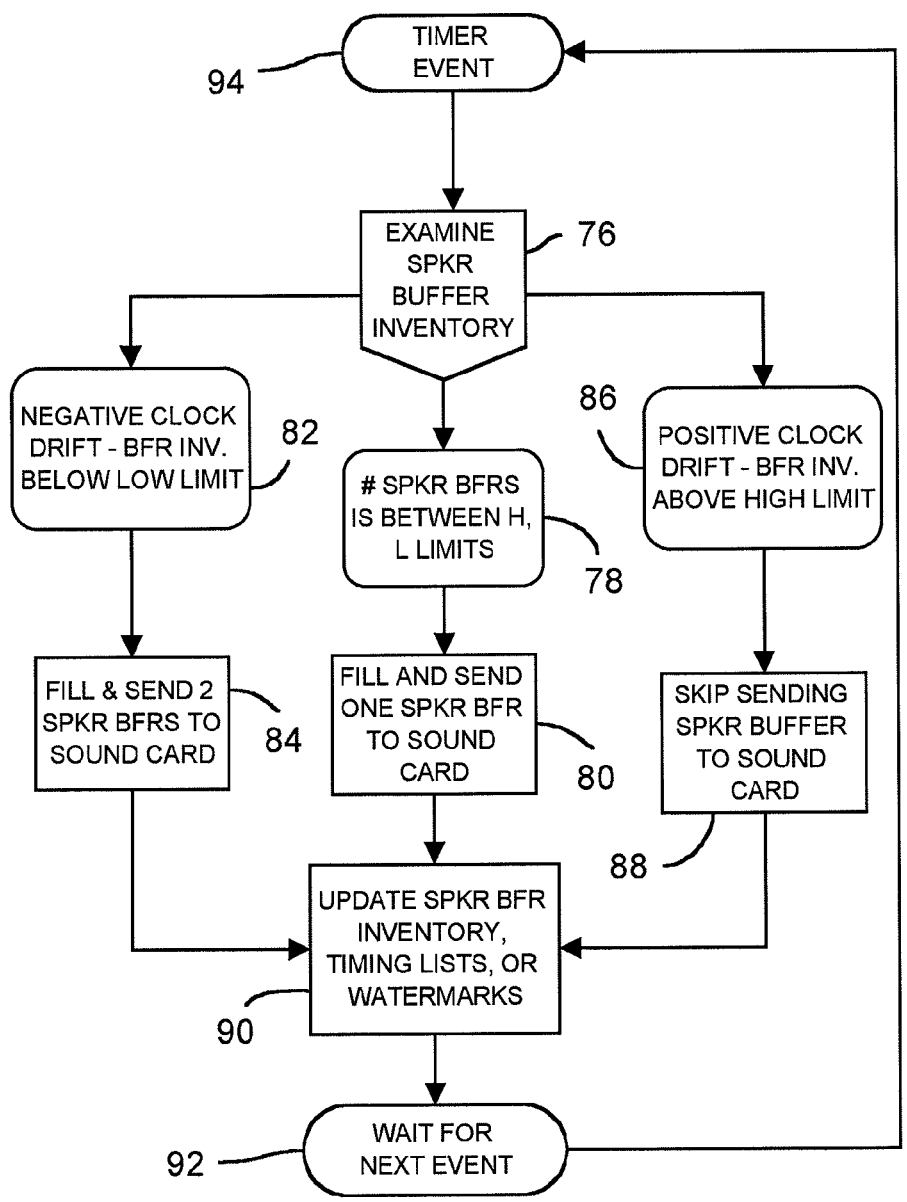
FIG. 6 is a flowchart of speaker-buffer management when a timeout has occurred.

FIG. 6 is a flowchart of speaker-buffer management when a timeout has occurred. A watchdog timer can be set up to generate a timer event when no microphone buffer arrivals have occurred for a long period of time. The watchdog timer is reset when a mic buffer arrives from the sound card, and the process of FIG. 5 is activated to manage the speaker buffers. During an ordinary full-duplex voice call, the timer event should not occur.

The microphone could be muted for a short period of time, such as when the person's manager interrupts, walks in, and talks to the local user. The local user may hit a "mute" button on the PC to prevent audio from being sent to the remote user while the local user is being interrupted by his manager.

Other problems could occur that delay or block arrival of mic buffers from the sound card. The process of FIG. 6 is activated by the timer event when the mic buffers do not arrive for whatever reason. The speaker-buffer count kept by the speaker buffer manager on the PC is examined, step 76, to determine how many speaker buffers to send to the sound card.

When the speaker-buffer count is between the upper and lower limits, step 78, the clock rates are well-matched and one speaker buffer is filled with voice data from the remote caller and sent from the PC to the top of the speaker queue in the sound card, step 80. The speaker-buffer count is increased by one, step 90, and the speaker buffer manager waits for the next event, step 92.

When the speaker-buffer count is below the lower limit, step 82, then negative clock drift is detected. To compensate for the slower speaker clock rate, two speaker buffers are filled with voice data from the remote caller and sent from the PC to the top of the speaker queue in the sound card, step 84. This helps to replenish the speaker-buffer queue on the sound card. The speaker-buffer count is increased by two, step 90, and the speaker buffer manager waits for the next event, step 92.

When the speaker-buffer count is above the upper limit, step 86, then positive clock drift is detected. To compensate for the faster speaker clock rate, no speaker buffers are filled and sent to the sound card, step 88. This allows more time to reduce the speaker-buffer queue on the sound card. The speaker-buffer count is no changed, step 90, and the speaker buffer manager waits for the next event, step 92.

Figure 7:
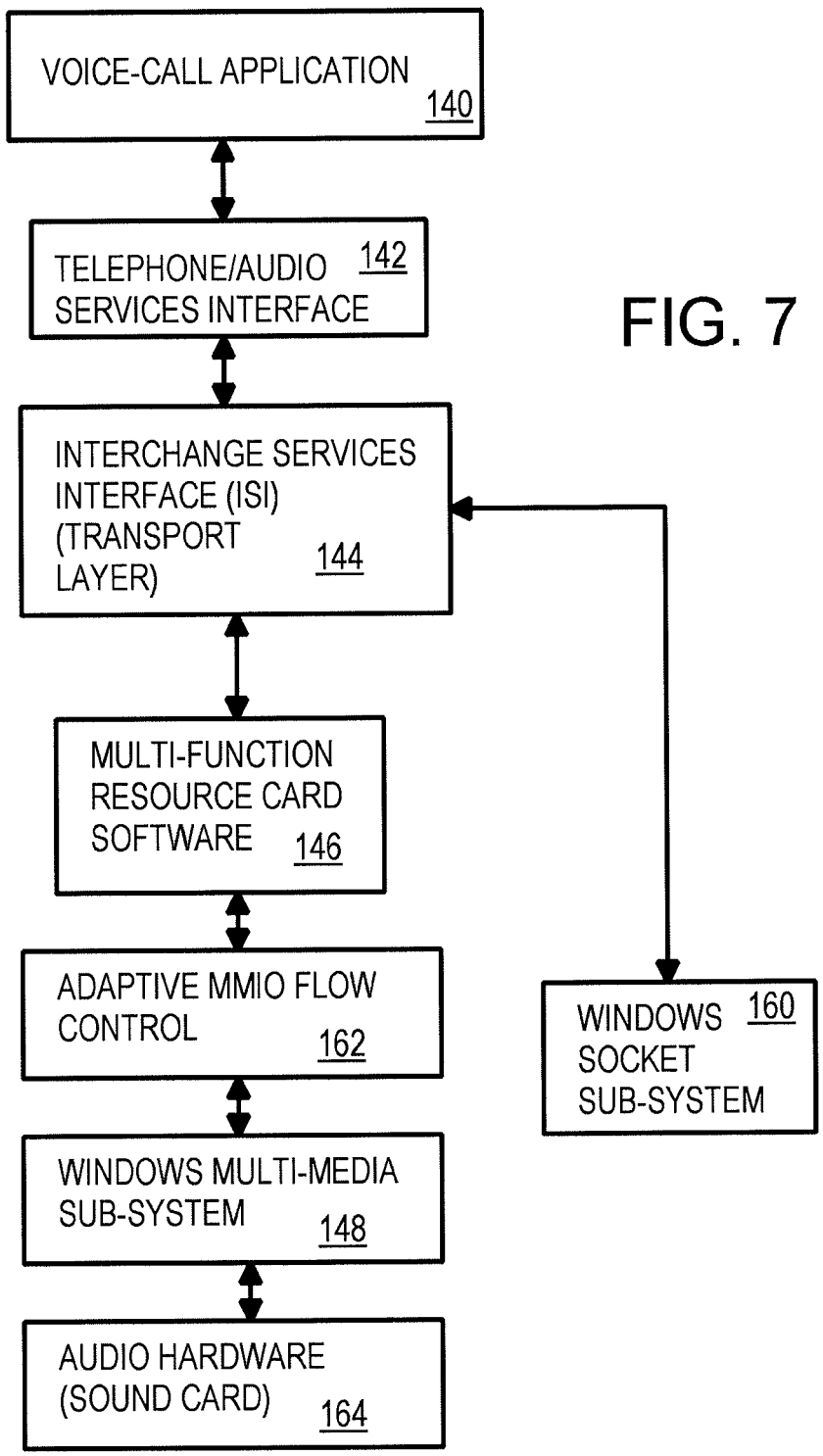
FIG. 7 is a layered diagram of a VoIP application using a speaker buffer manager to manage speaker buffers on a sound card.

FIG. 7 is a layered diagram of a VoIP application using a speaker buffer manager to manage speaker buffers on a sound card. Voice-call application 140 is a high-level application that can be operated by a user of the local PC. The user can initiate and terminate voice or audio/video calls over the Internet using a user interface to application 140.

Telephony/Audio Services Interface (TASI) 142 is a development environment that provides an application programming interface (API) for using library features or functions called by application 140. TASI 142 can have a variety of services such as call control (detecting, placing, and terminating calls between clients) and audio stream control and formatting.

Interchange services 144 corresponds to the OSI-model transport layer. Interchange services 144 provides packet transport using IP packets. Communication sockets in Windows socket sub-system 160 can be opened by Interchange services 144 to send and receive IP packets containing audio or video data to a remote caller over the Internet. Of course, socket sub-systems other than Windows can be substituted.

Multi-function resource 146 can be implemented in hardware or software or both. Multi-function resource 146 provides a host-based software layer that performs a variety of functions. Multi-function resource 146 can perform digital-signal processor (DSP) functions, such as voice compression, echo cancellation, bad frame interpolation for late or lost packets, silence compression, voice activity detection, and comfort noise generation. In addition, multi-function resource 146 provides the ability to play wave files on multi-media subsystem 148. Multi-function resource 146 can have three main subsystems: the voice compression subsystem, the packetization sub-system, and the voice quality sub-system.

Windows multimedia I/O subsystem 148 (Windows MMIO) contains the operating system sound-card wave interfaceimplementation drivers and low-level components that communicate with audio hardware 164, such as a sound card or audio subsystem. Speakers and a microphone, or other multi-media devices can be connected to audio hardware 164 controlled by multimedia subsystem 148.

Adaptive MMIO flow control 162 may be inserted above Windows multimedia I/O subsystem 148 and below multi-function resource 146 if present, or other higher-level components such as the transport layer.

Adaptive MMIO flow control 162 contains lower-level components of the speaker buffer manager. Adaptive MMIO flow control 162 can activate higher-level components of the speaker buffer manager to help manage the speaker buffers by sending events or calling routines in voice-call application 140 or TASI 142. Thus the speaker buffer manager can have low-level components in adaptive MMIO flow control 162 and higher-level components in voice-call application 140 or TASI 142.

Not all layers need to be present in all embodiments. Some layers such as 142, 144, 146 and 160 are optional and can be deleted or replaced by other components.

Figure 8:
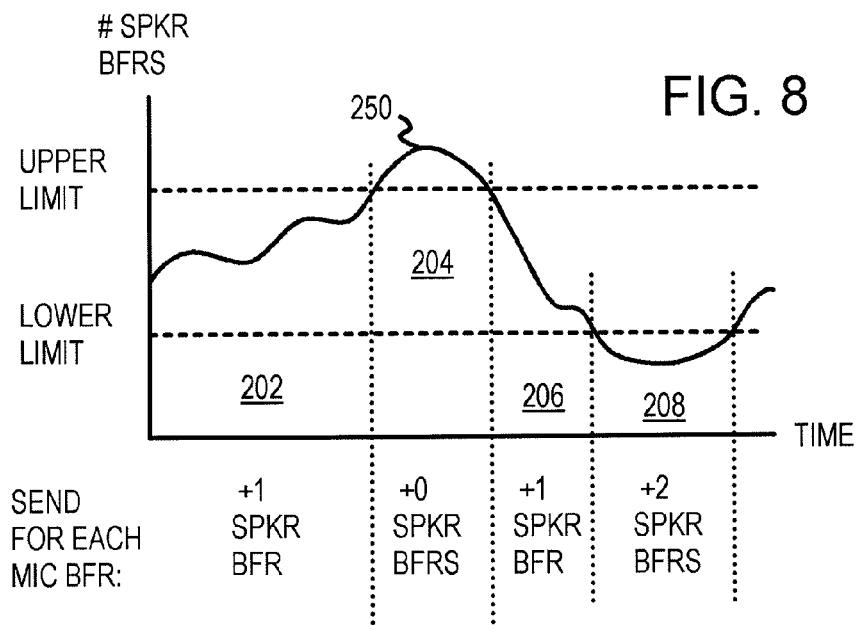
FIG. 8 is a graph highlighting speaker-buffer management by comparison of the speaker-buffer count to upper and lower limits.

FIG. 8 is a graph highlighting speaker-buffer management by comparison of the speaker-buffer count to upper and lower limits. Line 250 shows the speaker-buffer count over time, which tracks the number of speaker buffers in the speaker queue on the sound card. During time period 202, the speaker-buffer count is between the upper and lower limits and input and output clock rates are well-matched. One speaker buffer is sent to the sound card for each mic buffer arrival.

The speaker-buffer count rises above the upper limit during period 204. When mic buffers arrive from the sound card, no speaker buffers are sent during period 204. Empty speaker buffers recycled to the PC are not returned to the sound card, but are kept by the PC. Eventually, the number of speaker buffers on the sound card falls below the upper limit, and in period 206 one speaker buffer is sent to the sound card as each mic buffer arrives.

The speaker-buffer count has fallen below the lower limit during period 208. Two speaker buffers are filled and sent to the sound card for each mic buffer that arrives.

Figure 9:
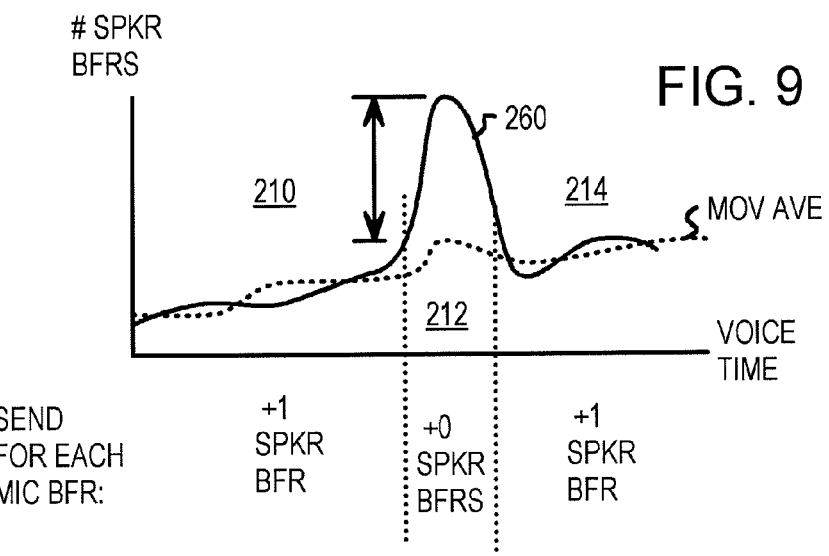
FIG. 9 is a graph highlighting speaker-buffer management by comparison of the speaker-buffer count to a moving average.

FIG. 9 is a graph highlighting speaker-buffer management by comparison of the speaker-buffer count to a moving average. Line 260 shows the speaker-buffer count over time. A moving average of line 260 is shown as the dotted line.

Rather than compare the speaker-buffer count to upper and lower limits, the speaker-buffer count is compared to the moving average in this alternate embodiment. When the speaker-buffer count is near the moving average, such as being between 80% and 150% of the moving average, one speaker buffer is sent to the sound card as each mic buffer arrives from the sound card. This occurs during periods 210 and 214.

During period 212, the speaker-buffer count has risen far above its moving average. For example, the speaker-buffer count may be more than double the moving average, well above the 80-150% desired range. Then no speaker buffers are sent, even when a mic buffer arrives, until the speaker-buffer count falls below the 150% threshold. The speaker-buffer count is reduced as the sound card recycles empty speaker buffers during period 212.

ALTERNATE EMBODIMENTS

Several other embodiments are contemplated by the inventor. Core manager 56, speaker buffer manager 40, microphone buffer processor 42, and other components may contain a variety of software modules including user interfaces and may call other modules, library, or operating system routines. The components of the software may be partitioned or combined in a wide variety of ways using modules, libraries, instances, procedures, etc.

The microphone and speakers may be combined on a headset or handset rather than be separate devices. The same duplexing problems may arise on non-physical sound card devices such as for telephone applicationsprogramming interface (TAPI/WAVE) devices, where a sound-card style of interface is used for a network audio stream or external device.

This invention is may be useful not only for an actual physical sound card, but also for a software application that simply uses the sound card style interface. The term sound card has been used, but the "sound card" is often not a true plug-in card, but can be integrated with other components, such as when the sound card is an audio controller integrated on the PC motherboard. A secondary audio device may be used on the PC with an attached headset or handset, but this device is still typically treated as a sound card on the PC even if it plugs in via USB, audio jacks, or even wireless links such as BlueTooth or 802.11.

The audio buffers may contain data having the same audio play time, but may differ in the number of bytes due to differences in audio coding formats. Headers and other information may also differ in size. One speaker buffer has been described as being sent for each microphone buffer received from the sound card at steady-state conditions. This is true when the audio play time of the speaker and microphone buffers are about the same. Two speaker buffers that have half the audio time of the arriving microphone buffer could be sent instead. Other numbers of buffers could be sent in response to different relative playback sizes of the speaker and microphone buffers. Sound cards may not physically accept buffers smaller than 60 ms, such as the 20 ms buffers. Their drivers may actually send groups of three 20 ms buffers when the buffer size is set to 20 ms for these kinds of sound cards.

Speaker buffers could be pre-filled by speaker buffer manager 40 or by another software component before the mic event occurs, but then sent to the sound card in response to the mic event. "Empty" audio buffers may still contain the old audio data that has been played or copied. In most cases, delivery of the buffers from the MMIO driver layer to the physical sound card is done by copying the contents across a bus (such as PCI, ISA, USB, etc) and creating a replica of the buffer at the sound card or sound device. The sound-card driver is responsible for getting the buffers to and from the sound card, and variations in the implementation from one vendor to the next do cause variations in the timing of buffer shipment from the VOIP application to the sound card, and in the rate that recycled buffers are returned. When using large prior-art style buffers, the affect of these variations is minimized, but at the cost of very large latency.

Audio buffers can be small storage areas in computer memory which hold sampled audio data to be conveyed from one device to another, such as from a microphone or to a speaker. A buffer is typically identified as a contiguous memory space with a known starting memory address and a known length. A queue or collection of buffers is used to keep a steady stream of audio data going to and from a device such as a sound card and the computer which is communicating to it. The buffers can be filled by the sound card and the PC signaled when the buffer is ready, then the PC can access the buffer, copy the data out of it and put the data to use. The section of memory which represents the buffer can then be handed back and re-used by the sound card for another load of audio data in the future so that memory is not continuously used up over time. For the MMIO interface, buffers to hold the audio data are typically created ahead of time by the application, and are prepared (handed to) the MMIO sub-system so that the MMIO layer can use the buffers for exchanges of data to and from the application and the sound-card or sound device.

On the PC the buffers could be stored in the PC's memory, such as a main-memory DRAM, hard disk, or a flash memory, while when on the sound card the buffers could be stored in a DRAM, SRAM, or flash memory on the sound card, or even be transferred among several memories. When the sound card is integrated with the PC motherboard, the sound card's memory can be mapped into the address space of the PC motherboard, or a driver can be responsible for replicating buffers of data from the memory on the PC motherboard to the memory on the sound card in a manner which makes it appear to the higher layers of software on the PC that the sound card's memory is visible locally on the PC motherboard. The same is true of USB audio devices. Other future hardware innovations may convey the overall MMIO buffer passing interface using new physical mechanisms, but resulting in the same behavior from the application's perspective, which is that it writes speaker data to a local buffer of memory and then hands ownership of that buffer to the MMIO layer, and conversely the MMIO layer periodically presents the application with microphone data contained in buffers that upon presentation belong to the application and are in its local memory since the application typically created the buffers at the start of the process.

Various combinations of software, hardware, or firmware implementations are possible and various routines can be called and executed sequentially or in parallel. While the VoIP packets have been described as being routed over the public Internet, packets may be routed over other networks or combinations of networks such as Ethernets, Intranets, wide-area networks, wireless networks, satellite links, etc. Unmanaged networks can be used or networks with some management. The audio packets can also include multi-media data such as images, video, or text. The voice data can be audio data that is often voice, but could include other audio data such as songs, music, traffic noise, etc.

The amount of voice data in packets can vary from packet to packet rather than be the same for all packets as described in the simplified examples. The jitter buffer may perform other functions, such as detecting and processing duplicate and missing packets.

Additional filtering of the speaker-buffer count could be performed. Many kinds of moving averages can be used, such as a simple arithmetic moving average, weighted moving averages that increase weighting of more recent data points, exponential moving averages, etc. Multiple limits could be used to further increase the number or audio playback time of audio buffers sent to the speaker queue when above a second upper limit. Negative counts and inverse counting could be substituted where a count is "increased" by reducing the count value. The upper and lower limits can also be adaptively determined for a given PC and sound card combination. The Speaker Buffer Manager could measure the average number of speaker buffers which reside on the sound card and then set low and high limits slightly above and slightly below that typical range so that periodic variations from the usual timing on that particular sound card do not result in drop outs or hiccups.

Speaker Buffer Manager 40 and Microphone Buffer Manager 42 can be implemented as a single Audio Manager with a single execution context while still performing both jobs and accepting both audio-out and audio-in events from the MMIO layer.

In certain timing situations, or to handle unusual audio devices, the Speaker Buffer Manager can be allowed to send an arbitrary number of buffers to the sound card rather than the usual 0, 1 or 2. This might typically happen where microphone data is for some reason not arriving and the speaker data must be delivered based on failsafe timeout events which might happen each 100 mSec and need to send, for example, 5 20 mSec speaker buffers to keep the speaker operational while microphone data has been suspended.

VOIP calls may be between two users on personal computers, or may consist of one user on a personal computer talking to a computer server or gateway, which converts the call from VOIP to telephone or PBX or private IP phone system formats. The call could also be between two telephone or private IP-phone users with a VOIP segment somewhere in the middle carrying the call from one location to another over the Internet or similar unmanaged network but terminating the call at each end on a telephone or PBX or IP phone. Calls could also involve a conversation between one user on a PC or telephone or IP phone, and at the other end an automated voice response system such as a banking application, voicemail, auto attendant, talking yellow pages or other automated voice service. More than two parties may exist in multi-way calling.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically software messages or electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A Voice-over-Internet-Protocol (VoIP) application executing on at least one processor, the VoIP application comprising:
   a microphone buffer processor configured to generate a speaker buffer management activation signal responsive to receiving audio data from an audio device; and
   a speaker buffer manager configured to:
      define an upper limit of a speaker buffer count for the audio device, the speaker buffer count being a number of speaker buffers, of a plurality of speaker buffers stored in a memory of the audio device, that contain audio data to be played by the audio device, and
      responsive to determining, for a plurality of received speaker buffer management activation signals, that the speaker buffer count is higher than the upper limit, remove audio data from at least one of the speaker buffers that contain audio data to be played out by the audio device.

2. The Voice-over-Internet-Protocol (VoIP) application of claim 1, wherein the speaker buffer manager is further configured to:
   identify audio data contained in at least one of the plurality of speaker buffers stored in the memory of the audio device as being different than voice data; and
   discard the audio data identified as being different than voice data from the corresponding at least one speaker buffer of the plurality stored in the memory of the audio device.

3. The Voice-over-Internet-Protocol (VoIP) application of claim 1, wherein the speaker buffer manager is further configured to:

calculate, during a specified time interval, an average number of the plurality of speaker buffers stored in the memory of the audio device that contain audio data to be played out; and use the calculated average to define the upper limit of the speaker buffer count.

4. The Voice-over-Internet-Protocol (VoIP) application of claim 1, wherein the speaker buffer manager is further configured to:

generate a timer event in response to determining that no speaker buffer management activation signals have been generated by the microphone buffer processor for a specified time interval; and in response to the timer event being generated, determine whether the speaker buffer count is higher than the upper limit.

5. A method for managing audio data storage for an audio device in communication with a computing device, the method comprising:

defining, by the computing device, an upper limit of a speaker buffer count for the audio device, the speaker buffer count being a number of speaker buffers, of a plurality of speaker buffers stored in a memory of the audio device, that contain audio data to be played out by the audio device;

generating, by the computing device, a speaker buffer management activation signal responsive to receiving audio data from the audio device; and in response to determining, for a plurality of generated speaker buffer management activation signals, that the speaker buffer count is higher than the upper limit, the computing device removing audio data from at least one of the speaker buffers that contain audio data to be played out by the audio device.

6. The method of claim 5, wherein removing audio data from at least one of the speaker buffers that contain audio data to be played out by the audio device includes:

identifying audio data contained in at least one of the plurality of speaker buffers stored in the memory of the audio device as being different than voice data; and discarding the audio data identified as being different than voice data from the corresponding at least one speaker buffer of the plurality stored in the memory of the audio device.

7. The method of claim 5, further comprising:

calculating, by the computing device, during a specified time interval, an average number of the plurality of speaker buffers stored in the memory of the audio device that contain audio data to be played out; and using the calculated average to define the upper limit of the speaker buffer count.

8. The method of claim 5, further comprising:

generating a timer event in response to determining that no speaker buffer management activation signals have been generated for a specified time interval; and in response to the timer event being generated, the computing device determining whether the speaker buffer count is higher than the upper limit.

9. A non-transitory computer-readable medium comprising computer-executable instructions that when executed cause a computer device to perform a method comprising:

defining an upper limit of a speaker buffer count for an audio device, the speaker buffer count being a number of speaker buffers, of a plurality of speaker buffers stored in a memory of the audio device, that contain audio data sent from a computer for playout by the audio device;

generating a speaker buffer management activation signal in response to the computer receiving audio data from the audio device; and in response to determining, for a plurality of generated speaker buffer management activation signals, that the speaker buffer count is higher than the upper limit, removing audio data from at least one of the speaker buffers that contain audio data to be played out by the audio device.

10. The non-transitory computer-readable medium of claim 9, wherein the computer-executable instructions further cause the computer device to perform:

identifying audio data contained in at least one of the plurality of speaker buffers stored in the memory of the audio device as being different than voice data; and discarding the audio data identified as being different than voice data from the corresponding at least one speaker buffer of the plurality stored in the memory of the audio device.

11. The non-transitory computer-readable medium of claim 9, wherein the computer-executable instructions further cause the computer device to perform:

calculating, during a specified time interval, an average number of the plurality of speaker buffers stored in the memory of the audio device that contain audio data to be played out; and using the calculated average to define the upper limit of the speaker buffer count.

12. The non-transitory computer-readable medium of claim 9, wherein the computer-executable instructions further cause the computer device to perform:

generating a timer event in response to determining that no speaker buffer management activation signals have been generated for a specified time interval; and in response to the timer event being generated, determining whether the speaker buffer count for the audio device is higher than the upper limit.

* * * * *